United States Patent [19]

Matsuda et al.

[11] Patent Number: 4,466,693
[45] Date of Patent: Aug. 21, 1984

[54] HOLOGRAPHIC STRAIGHTNESS METER

[75] Inventors: Kiyofumi Matsuda; Koji Tenjinbayashi, both of Ibaraki; Tsuguo Kohno, Tokorozawa, all of Japan

[73] Assignees: Agency of Industrial Science and Technology; Ministry of International Trade and Industry, both of Tokyo, Japan

[21] Appl. No.: 322,460

[22] Filed: Nov. 18, 1981

[30] Foreign Application Priority Data

Nov. 25, 1980 [JP] Japan .................. 55-165618
Dec. 17, 1980 [JP] Japan .................. 55-178615

[51] Int. Cl.$^3$ .................. G03H 1/02; G01B 11/27
[52] U.S. Cl. .................. 350/3.6; 356/138
[58] Field of Search .................. 350/3.6, 3.7; 356/138, 356/150

[56] References Cited

FOREIGN PATENT DOCUMENTS 55-103402 8/1980 Japan .
56-135103 10/1981 Japan .

OTHER PUBLICATIONS

Stroke, G. W., "An Alignment Interferometer for Precision Straightness-Measurements and Control Even of Rapidly Moving Carriages", JOSA, vol. 51, No. 12, Dec. 1961, pp. 1340, 1341.

Primary Examiner—Bruce Y. Arnold
Attorney, Agent, or Firm—Kurt Kelman

[57] ABSTRACT

A holographic straightness meter comprising an optical element and a hologram disposed on a moving member and one pair of reflection elements disposed on a fixed member. The object beam and reference beam from the optical element are reflected by the reflection elements so as to impinge upon the hologram and form interference fringes on the screen placed behind the hologram. The number, interval, and inclination of these interference fringes vary with the amount of lateral displacement of the moving member. Thus by analyzing the interference fringes for such factors, the amount of the lateral displacement of the moving member can be determined.

8 Claims, 9 Drawing Figures

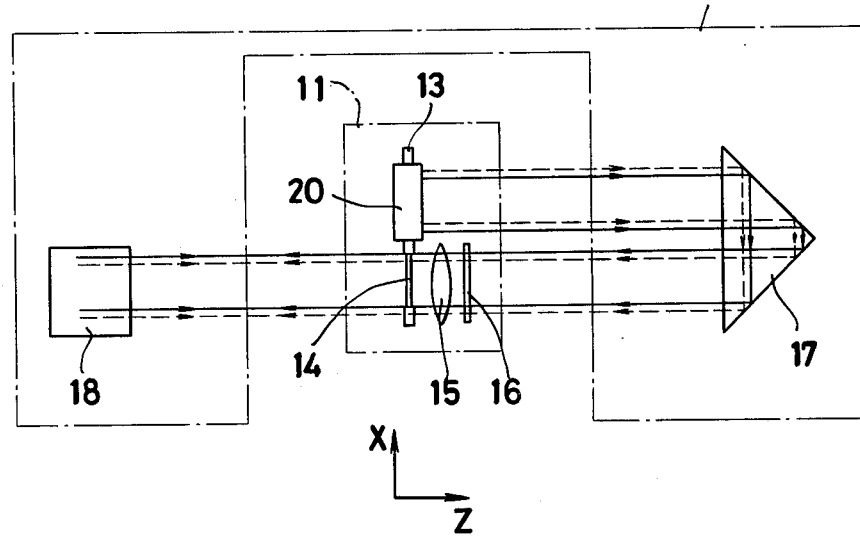
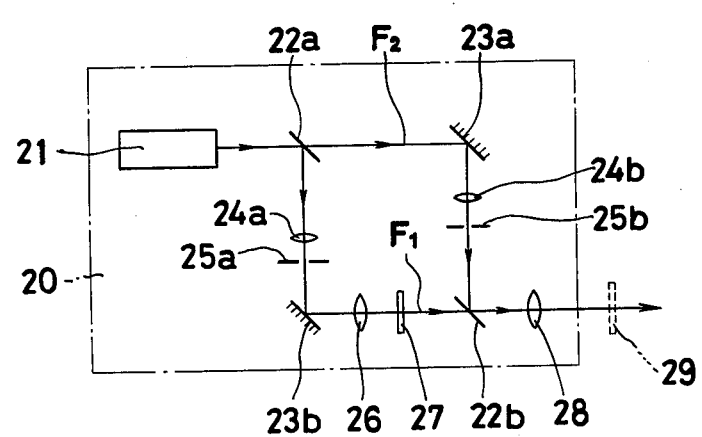

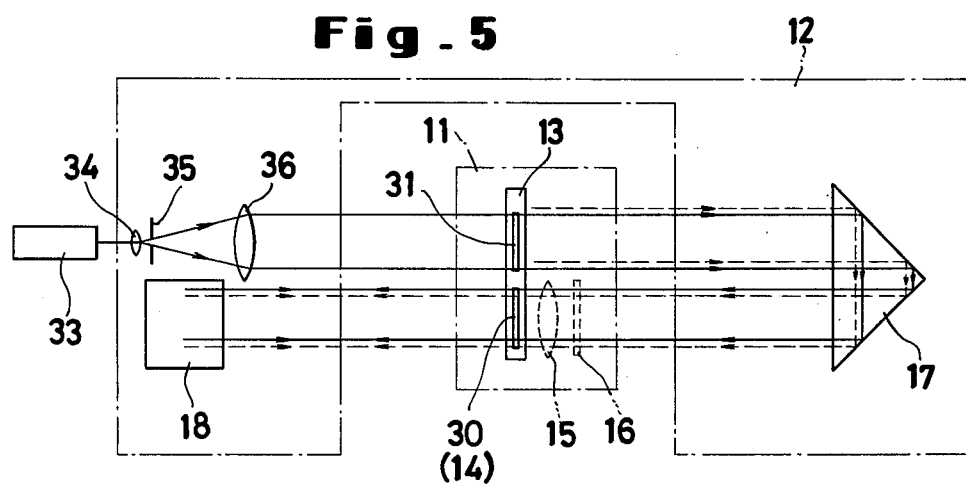
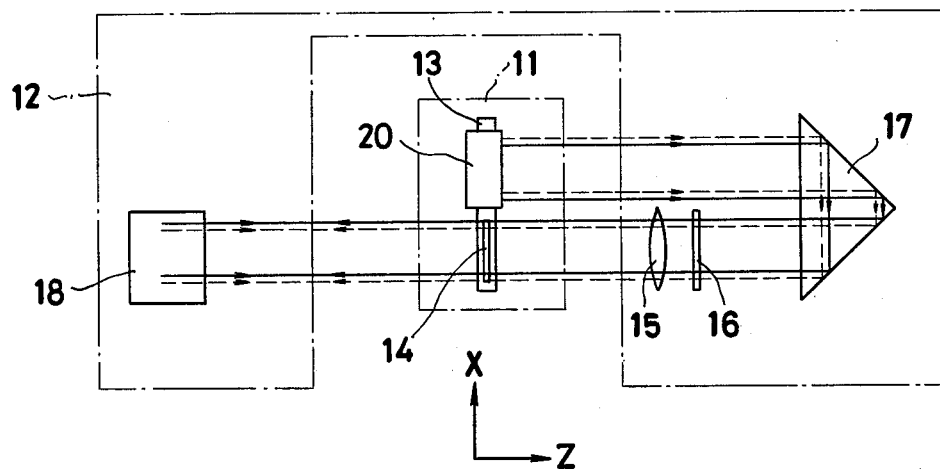
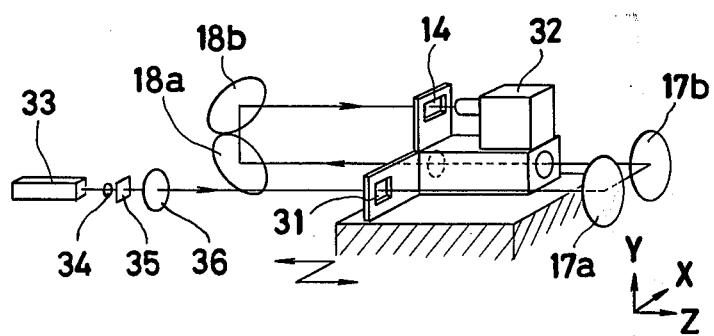

HOLOGRAPHIC STRAIGHTNESS METER

BACKGROUND OF THE INVENTION

This invention relates to a straightness meter utilizing holography. In a machine tool, for example, a tool slide is adapted to move in a striaght line along a guide. The degree of straightness of this movement constitutes an important factor for determining the degree of machining accuracy. In such machine tools, therefore, the tool slides must be tested for lateral displacement (namely displacement in the horizontal direction and in the vertical direction in the plane perpendicular to the direction of the tool movement; hereinafter referred to as "lateral displacement") at the time that the machine tools are assembled or subjected to test for accuracy. There have been made attempts at improving machining accuracy of machine tools by constantly monitoring the lateral displacement of their tool slides thereby controlling the straightness of their tools' movement at all times during the operation of the machine tools.

In such attempts, use is made of straightness meters. Heretofore, autocollimators and laser straightness meters (otherwise known as tooling lasers) have been utilized as optical straightness meters. For lack of accuracy or for some other fault, such conventional straightness meters have fallen short of satisfying the purpose mentioned above.

Recently, the holographic technique has been applied to the measurement of interference and the nature of the interference fringes produced has been elucidated. This achievement has led to the idea of developing a method of holographic interference capable of measuring lateral displacement in a two-dimensional plane and applying this method to a straightness meter. In this case, in order for the hologram to serve effectively as a straightness meter, realization of the real-time interference is an indispensable requirement. So far, the holographic interference method has been chiefly studied on the basis of the double-exposure technique because experiments by the real-time interference technique have been found very difficult. Besides, the conventional straightness meters utilizing the holographic interference method have unsolved problems regarding the instrumental accuracy, the effects of air disturbance and external vibrations, and the measurable range of distance to be traveled by their movable components along the optical axis. For the purpose of solving some of these problems, one of the inventors of this invention developed a new straightness meter utilizing holography which made it possible to realize real-time interference, alleviate the effects of air disturbance and external vibration, and to provide effective measurement of lateral displacement.

This previously developed holographic straightness meter is broadly composed of an optical unit to be mounted on a moving member such as a tool slide of the machine tool under measurement and an optical unit to be mounted on a fixed member opposed to the aforementioned moving member. The optical unit on the aforementioned fixed member comprises a laser generator, a beam splitter for dividing the beam from the laser into two beams, and a diffusing plate placed in the path of one of the divided beams. The optical unit on the moving member comprises a hologram and a screen disposed behind the hologram. By this straightness meter, the displacements of the moving member, i.e., the displacements in the horizontal direction and those in the vertical direction, in a plane perpendicular to the optical axis of the light of the object under test can be detected. In this holographic straightness meter, however, the length of the optical path from the diffusing plate to the hologram varies with the movement of the moving member and this variation affects the formation of interference fringes. For ideal operation of this straightness meter, therefore, it is necessary that the effects brought about on the formation of interference fringes by the movement of the movable member along the straight course of its movement should be eliminated. The accuracy of measurement by this meter is enhanced in proportion as the change in the number of interference fringes for fixed lateral displacement is increased. Thus, the straightness meter is desired to be so constructed that there appears a large change in the number of interference fringes to be observed.

SUMMARY OF THE INVENTION

One object of this invention is to provide a holographic straightness meter, which readily realizes real-time interference, alleviates the effects of air disturbance and external vibration, eliminates the effect of rotation as well as the effect on the formation of interference fringes by the movement of the movable member along the course of its straight movement, and improves the accuracy of measurement by amplifying the lateral displacement of the object under test.

To accomplish the object described above according to this invention, there is provided a holographic straightness meter which comprises a light-emitting unit for emitting an object-diffusion beam and a reference beam from the moving member, a pair of reflection elements disposed on the fixed member for the purpose of parallelly reflecting the diffusing object beam and the reference beam from the light-emitting unit, a hologram disposed on the moving member in the path of the diffusing object beam and the reference beam proceeding from the reflection elements, and a screen disposed behind the hologram.

When the object beam and the reference beam from the light-emitting unit are projected on the hologram, interference fringes are generated on the screen. In this case, the number of such interference fringes and the intervals separating them remain unchanged when the moving member is moved along the optical axis, but they are changed when the moving member is displaced either in the horizontal direction or in the vertical direction relative to the optical axis. Further, the angle of the interference fringes to be formed is changed in proportion to the magnitude of the displacement in the vertical direction. By the observation of these changes in the interference fringes formed on the screen, therefore, the lateral displacement of the moving member under test can be detected on the real-time basis with accuracy on the order of microns. Further in the present invention, since the object beam and the reference beam are reflected by the pair of reflection elements before they impinge upon the hologram, the amount of the lateral displacement of the moving member is amplified to twice its original amount. Thus, the accuracy of measurement is improved that much. When the straightness meter is constructed by using two holograms each of which is an inline type hologram (that is, a Gabor type hologram), it then enjoys an increase in the range of the movement of the moving member in the optical path.

BRIEF EXPLANATION OF THE DRAWINGS

FIG. 3 is a schematic plan view of the straightness meter of FIG. 2.

FIG. 4 is an explanatory diagram showing one embodiment of a light-emitting unit to be used in the straightness meter of the present invention.

FIG. 5 is a schematic plan view showing a method of producing the hologram used in the straightness meter according to the present invention.

FIG. 6 is a schematic plan view showing the second embodiment of the straightness meter of this invention.

FIG. 7 is a schematic perspective view showing the third embodiment of the straightness meter of the present invention.

DESCRIPTION OF THE PREFERRED EMBODIMENTS

This invention relates to a holographic straightness meter which detects undesirable lateral displacement in movement, particularly in the movement of machine tools with high accuracy for the purpose of improving the machining accuracy of such machine tools.

Before describing the straightness meter of the present invention, the straightness meter constituting the basis of the present invention will be briefly described with reference to FIG. 1.

Figure 1:
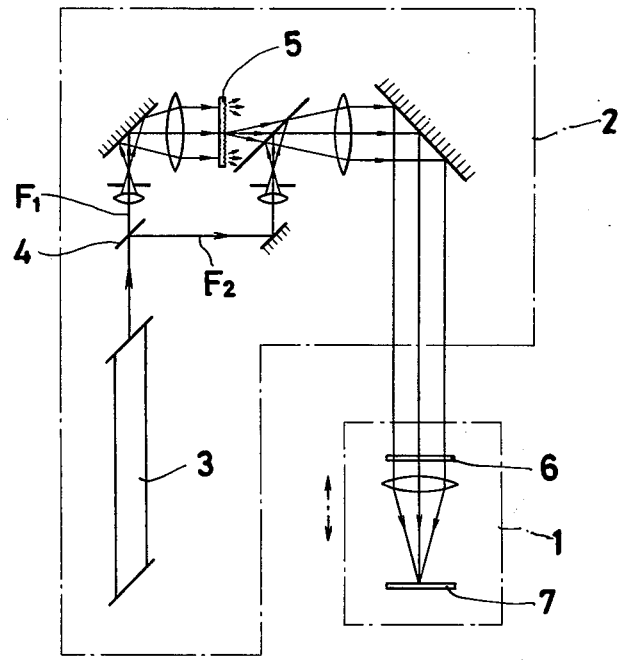
FIG. 1 is a schematic explanatory diagram of a holographic straightness meter forming the basis of this invention.

As illustrated in FIG. 1, this prototype is operated by the steps of causing a laser 3 included in an optical unit 2 mounted on the fixed member to emit a laser beam, dividing the laser beam by a beam splitter 4 into a light beam $F_1$ and a light beam $F_2$, allowing the light beam $F_2$ to impinge upon a hologram 6 included in an optical unit 1 mounted on the moving member thereby causing the hologram 6 to reconstruct an object beam (reconstructed object beam), separately allowing the light beam $F_1$ to impinge upon a diffusing plate 5, causing the object beam from the diffusing plate 5 to impinge upon the hologram 6, and enabling the object beam which has passed through the hologram to interfere with the aforementioned reconstructed object beam. The interference fringes formed by this interference are projected visibly on the screen 7. The observation of the interference fringes permits desired detection of the lateral displacement of the object beam relative to the optical axis.

In the straightness meter constructed as described above, the optical unit disposed on the moving member subjected to measurement is translated in the direction of the optical axis. Since even this translation alone imparts a curvature (bend) to the pattern of the interference fringes, the measurement of displacement becomes difficult. Further, since this method of measurement relies on the change in the number of interference fringes relative to the lateral displacement of the moving member, the extent of the change in the number of interference fringes is desired to be increased for the purpose of improving the accuracy of measurement. In the case of the straightness meter of the construction described above, however, the improvement of the accuracy of measurement is limited by the small change in the number of interference fringes.

Now, the holographic straightness meter of the present invention will be described with reference to the drawing.

Figure 2:
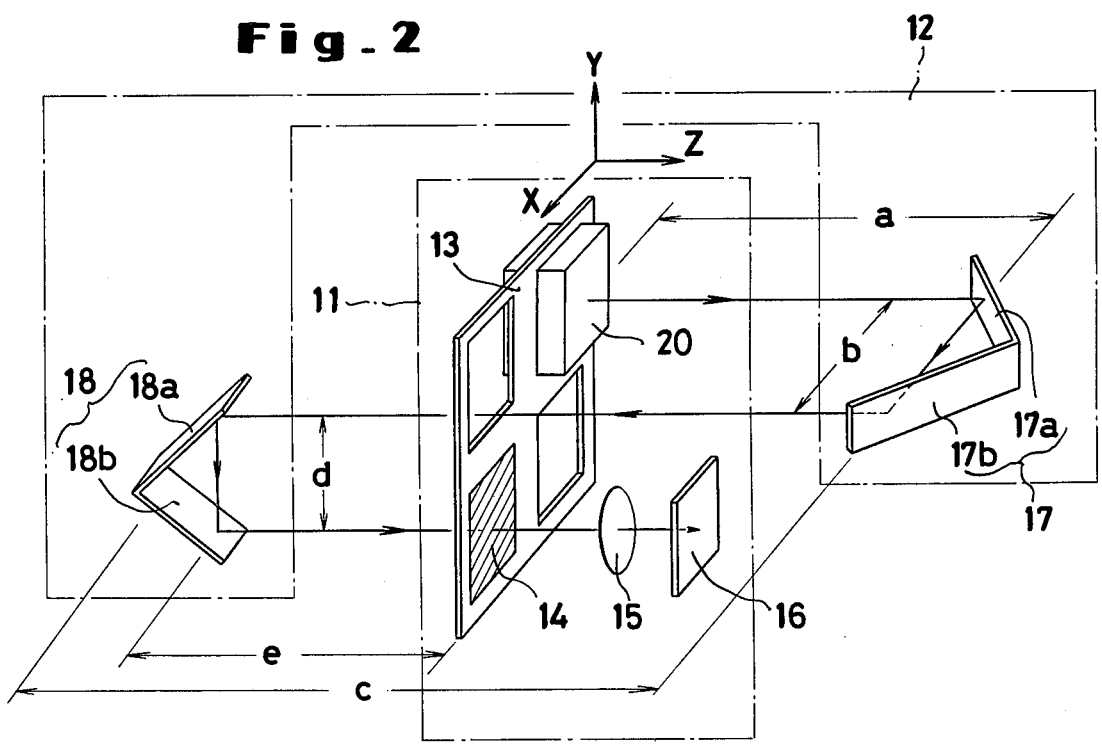
FIG. 2 is a schematic perspective view of the first embodiment of the straightness meter of the present invention.

FIGS. 2 and 3 show the first embodiment of the straightness meter of the present invention, which comprises an optical unit 11 mounted on a moving member such as a tool slide in a machine tool and an optical unit 12 mounted on a fixed member such as the base of the machine tool.

In the present embodiment, the moving optical unit 11 comprises an optical element 20 as means for emitting a diffusing object beam and a reference beam, a hologram 14, and a collimator lens 15 and a screen 16 disposed on the optical axis behind the hologram 14. The optical element 20 and the hologram 14 are carried on a support member 13. This support member 13, the collimator lens 15, and the screen 16 are translated in conjunction with the moving member of the machine tool in the direction of the optical axis.

The fixed optical unit 12 comprises reflection elements 17, 18, so that the beams of light impinging upon the two reflection elements are reflected each at an angle of 180°. In the embodiment of FIG. 2, the reflection elements 17, 18 are formed of pairs of perpendicularly intersecting mirrors 17a, 17b and 18a, 18b. In the embodiment of FIG. 3, the reflection elements 17, 18 are prisms. The reflection element 17 is disposed so as to change the optical path from the optical element 20 at an angle of 180° in the x-z plane and the reflection element 18 to change the optical path from the reflection element 17 at an angle of 180° in the y-z plane. The beam of light thus reflected by the reflection element 18 advances and impinges upon the hologram 14.

FIG. 4 represents one embodiment of the optical element 20, which comprises a laser 21, beam splitters 22a, 22b, mirrors 23a, 23b, microscope objectives 24a, 24b, pinholes 25a, 25b, a collimator lens 26, a diffusing plate 22 of ground glass, and a collimator lens 28. This is just one example of the optical element. The optical element 20 effectively fulfils its function in any other construction so far as it is capable of generating a diffusing light beam $F_1$ and a reference light beam $F_2$ both of one and the same phase. For example, adoption of a hologram capable of reconstructing these two beams greatly simplifies the construction.

A method for the production of a hologram 31 usable in the place of the optical element 20 described above will be explained with reference to FIG. 4. This hologram is formed by placing a photosensitive material 29 on the optical axis of the collimator lens 28 of the optical element 20, then energizing the laser 21, causing the laser beam thus generated to be divided into two beams by the beam splitter 22a, diffusing one light beam $F_1$ through the microscope objective 24a and the collimator lens 26, allowing the diffused light beam in the form of a collimated beam to illuminate the diffusing plate 27, disposing the collimator lens 28 so that the diffusing plate 27 will fall in the front side focal plane, and causing the light beam to impinge upon the photosensitive material 29 disposed behind the lens 28. The other light beam $F_2$ is converted into a collimated beam by passage through the microscope objective 24b and the lens 28 and used as the reference beam. In this manner, the object beam from the diffusing plate 25 is holographically recorded on the photosensitive material with the aid of the plane reference beam. The photosensitive material is photographically treated to give rise to a hologram 31 which can be used in the place of the optical element 20.

Now, the formation of a hologram 14 will be described with reference to FIG. 5. The optical element 20 disposed on the support member 13 in the moving optical unit 11 illustrated in FIG. 2 is replaced with the aforementioned hologram 31 usable in the place of the optical element 20. A photosensitive material 30 is placed where the hologram 14 is to be disposed in the support member 13. Then, the light beam from the laser 33 is converted into a collimated beam by passage through the microscope objective 34, the pinhole 35, and the collimator lens 36 and this collimated beam is caused to impinge upon the hologram 31. Consequently, the wavefront (object beam) of the diffusing plate 27 is reconstructed. This wavefront is reflected by the reflection elements 17, 18 and passed to the photosensitive material 30. Of the light beam which impinges upon the hologram 31, one part thus results in the formation of the reconstructed beam. The other part of the light beam (reference beam), which is allowed to pass through the hologram 31 instead of being diffracted, also advances along the same path as described above and reaches the photosensitive material 30. With this light beam as the reference beam, the wavefront of the diffusing plate 27 is holographically recorded on the photosensitive material 30. The photosensitive material, through a photographic treatment, is converted into a hologram 31.

The measurement of the lateral displacement of the moving member under test by the straightness meter constructed as described above is carried out as follows. First, the laser 21 of the optical element 20 is oscillated to produce the object beam and reference beam of the diffusing plate 27. Where the object beam and reference beam are to be produced by using a hologram instead of the optical element, the diffusing plate 27 is made to generate the object beam and reference beam by placing the hologram 31 produced by the method described above in the place of the optical element 20 to be disposed on the support member 13, producing a collimated beam by using an optical unit of the same construction as used in the construction of the hologram 31, and reconstructing this collimated beam by irradiation upon the hologram 31 (FIG. 5). In this case, the optical unit used for producing the collimated beam has the same effect when it is mounted on the fixed member or on the moving member. By attaching this optical unit to the fixed member, however, the overall mechanism becomes simpler. The object beam and reference beam thus generated are simultaneously reflected by the reflection elements 17, 18, projected together onto the hologram 14 on the moving member. Of the two light beams, the reference beam serves to reconstruct the object beam formerly recorded on the hologram 14 and give rise to the reconstructed object beam. The reconstructed object beam is caused to undergo real-time interference with the aforementioned object beam. The interference fringes which are generated in consequence of the interference are visibly projected on the screen 16 placed on the focal plane of the lens 15.

When the moving member moves exactly on or parallel with the optical axis, the interference fringes do not appear on the screen 16. This is because the two object beams have entirely the same phase. When the moving member 11 in such a state produces a lateral displacement, the hologram 14 is laterally displaced and, consequently, the wavefront of the reconstructed object beam is produced as displaced laterally. When such a lateral displacement (in the direction of the x axis) is produced, straight interference fringes appear in the vertical direction on the screen 16. The number of such interference fringes or the interval separating the interference fringes is directly proportional to the amount of the lateral displacement involved. When the moving member is displaced in the vertical direction (in the direction of the y axis), straight interference fringes appear in the horizontal direction on the screen 16. When the moving member is displaced in both the vertical and horizontal directions, the interference fringes which appear on the screen are inclined. By finding the angle of this inclination, the number of interference fringes, and the distance separating these interference fringes, therefore, the directions and amount of displacement of the moving member can be determined. Of course, a scale for the conversion between the conditions of the interference fringes and the amount and direction of the displacement of the moving member can be obtained in advance by keeping the moving member undisplaced and instead moving the hologram 14 in prescribed amounts in lateral directions and placing the moved hologram on the support member 13 thereby producing corresponding interference fringes on the screen.

The embodiment illustrated in FIGS. 2 and 3 represents a case wherein the collimator lens 15 and the screen 16 are disposed on the moving member 11. The same effects of these components can be obtained by disposing them on the fixed member as shown in FIG. 6, because the length of the optical path between the optical element 20 (hologram 31) and the hologram 14 remains unchanged even when the moving member is moved. When the optical element is replaced by the hologram, the overall mechanism is simplified because it is the pair of holograms 31, 14 carried on the support member 13 that is mounted on the moving member. As the means composed of the collimator lens 15 and the screen 16 and used for forming the reconstructed image, there may be used a camera such as the ITV camera 32 shown in FIG. 7. In this case, the position of the camera is adjusted so that the photographic film or image sensor element will fall at the position of the screen 16.

The present invention is characterized by (i) the fact that since the optical path is turned at an angle of 180° by the reflecting elements 17, 18, the amount of lateral displacement of the moving member is amplified to twice the original amounts and, consequently, the accuracy of measurement is improved that much, (ii) the fact that although the optical element 20 irradiates the light beam upon the hologram 14, the length of the optical path remains unchanged despite the movement of the moving member in the direction of the optical axis and the adverse effects that would otherwise act on the interference fringes because of the change in optical path are totally absent, and (iii) the fact that the optical unit to be disposed on the moving member is consequently simplified.

Figure 8:
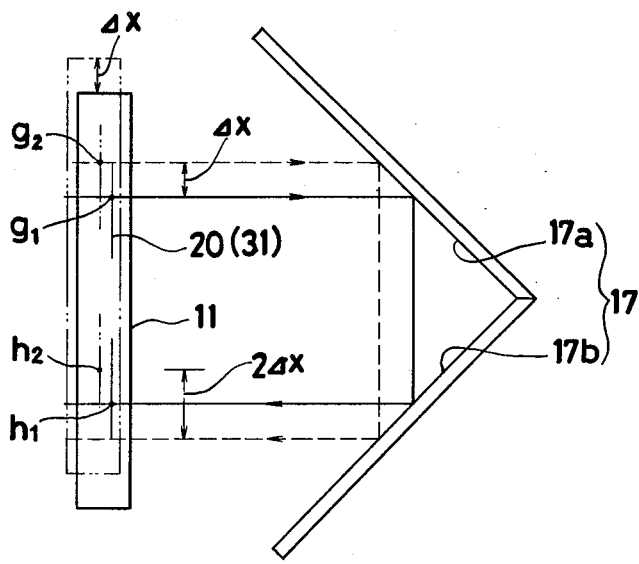
FIG. 8 is an explanatory diagram illustrating the condition in which the straightness meter of the present invention detects lateral displacement.

The characteristic point (i) described above will be described specifically. A careful study of the lateral displacement of the moving member in the direction of the x axis will reveal that before the optical unit 11 is displaced, the light beam issued from the point $g_1$ on the optical element 20 is reflected twice by the reflection elements 17a, 17b and advanced to the point $h_1$ on the hologram 14 as shown in FIG. 8. On the assumption that the point $g_1$ and the point $h_1$ correspond to each other, the lateral displacement $\Delta x$ of the moving member also displaces the point $g_1$ and the point $h_1$ by an increment of $\Delta x$ to the point $g_2$ and the point $h_2$ respectively. Now the light beam issued from the point $g_2$ has its optical path turned by an angle of 180° because of the reflection by the reflection element 17. Then, this light beam reaches the hologram 14 at a point separated by a distance of $2\cdot\Delta x$ from the point $h_2$. This is also true of the lateral displacement made in the direction of the y axis.

Thus, the lateral displacement of $\Delta x$ made by the moving member produces a displacement of $2\cdot\Delta x$ on the hologram 14, indicating that the lateral displacement has been amplified to twice the original amount. For a fixed amount of displacement, therefore, the number of interference fringes of equal inclination obtained by this invention is twice that which is obtained by the holographic straightness meter previously developed. Let $\Delta\epsilon$ stand for the interval separating the interference fringes of equal inclination, $\Delta x$ for the amount of displacement of the moving member, $\lambda$ for the wavelength of the light, and f for the focal distance of the lens, then the interval obtained in the aforementioned holographic straightness meter is expressed by the following formula.

$$\Delta\epsilon = (\lambda f/\Delta x) \quad (1)$$

In the case of the straightness meter of the present invention, the interval is expressed by the following formula.

$$\Delta\epsilon = (\lambda f/2\Delta x) \quad (2)$$

Where the former holographic straightness meter produces one interference fringe of equal inclination within the field of the screen, the straightness meter of the present invention produces two interference fringes of equal inclination. Thus, the accuracy of measurement offered by this invention is twice that obtainable by the former meter.

For example, where the displacement $\Delta x$ of the moving member is 100 $\mu$m (0.1 mm), the wavelength $\lambda$ is $0.63 \times 10^{-3}$ mm, and the focal distance f of the lens is 360 mm, the theoretical value of the interval $\Delta\epsilon$ separating the interference fringes of equal inclination will be found by the formula (2) to be 1.134 mm, as follows.

$$\Delta\epsilon = (0.63 \times 10^{-3} \times 360)/2 \times 0.1 = 1.134$$

Figure 9:
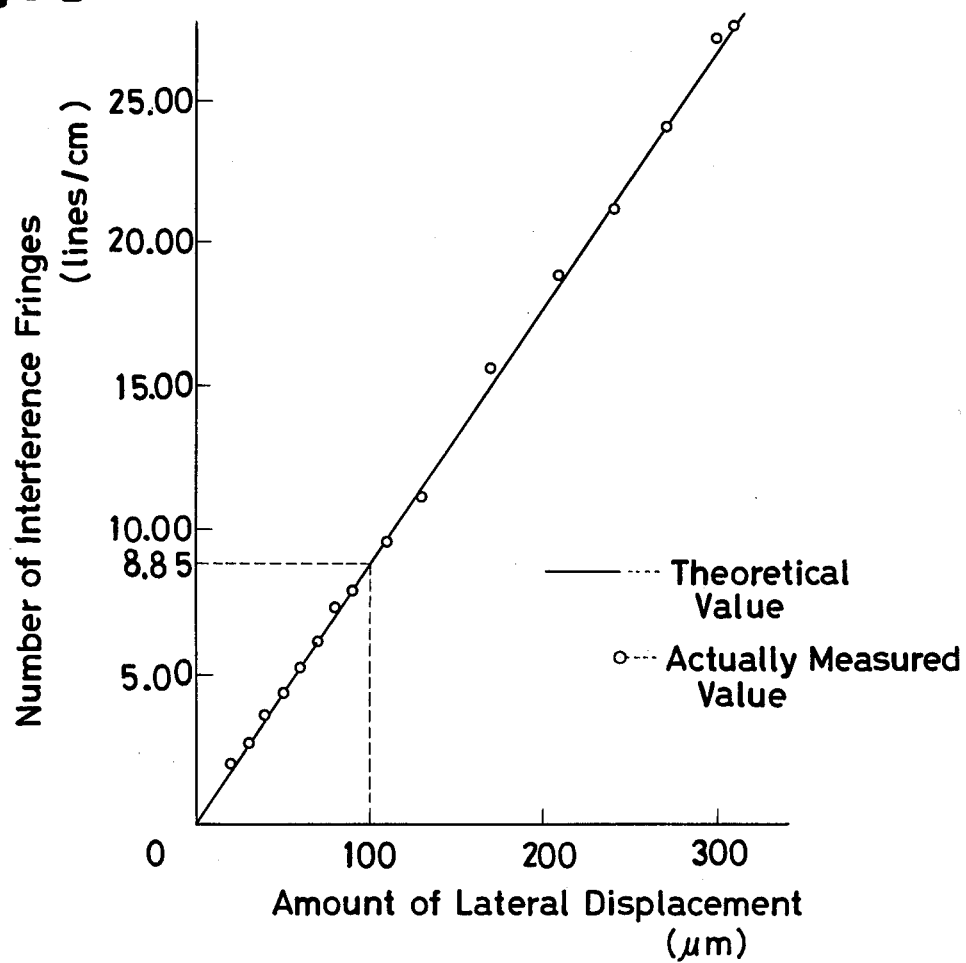
FIG. 9 is a graph showing the relation between the amounts of lateral displacement and the number of interference fringes measured by the straightness meter of the present invention.

As illustrated in FIG. 7, one pair of holograms 31, 14 were disposed on the tool slide, a camera provided with a lens having a focal distance of 360 mm was set behind the hologram 14, and a pair of reflection elements 17, 18 were opposed to each other across the tool slide as separated by a distance of 1 meter. From the laser 21, a light beam of a wavelength of $0.63 \times 10^{-3}$ mm was emitted, introduced in the form of a collimated beam into the hologram 31. The object beam and the reference beam from this hologram 31 were reflected by the pair of reflection elements and caused to impinge upon the hologram 14. The interference fringes consequently formed were photographed by the camera. In advance, the whole arrangement was set so that no interference fringe would occur when the tool slide remained undisplaced. Then the tool slide was displaced in amounts of the order of 10 $\mu$m in the lateral direction and the numbers of interference fringes consequently produced were counted. The results were as shown in the graph of FIG. 9. The horizontal axis of the graph is the scale for the displacement of the tool slide and the vertical axis the scale for the number of interference fringes appearing in a distance of 1 cm (10 mm). In the experiment described above, a lateral displacement of 50 $\mu$m of the tool slide produced about 4.4 interference fringes and a lateral displacement of 90 $\mu$m produced about 8 interference fringes. It is noted from the graph that when the tool slide is displaced by 0.1 mm (100 $\mu$m), 8.85 interference fringes of equal inclination appear per cm.

The interval $\Delta\epsilon$ between the interference fringes of equal inclination is found by calculation to be as follows.

$$\Delta\epsilon = (10 \text{ mm}/8.85) = 1.13 \text{ mm}$$

This value is practically in agreement with the theoretical value mentioned above, indicating that the straightness meter of the present invention can measure the lateral displacement of the moving member with an accuracy conforming to the theoretical value.

The aforementioned characteristic point (ii) will be described. As illustrated in FIG. 2, the beam from the optical element 20 is reflected by the mirror 17a of the reflection element 17, then reflected again by the mirror 17b, reflected by the mirror 8a of the reflection element 18, and finally reflected by the mirror 18b, and caused to impinge upon the hologram 14. Let "a" stand for the length of optical path from the optical element 20 to the reflection element 17, "b" for the length within the reflection element 17, "c" the length from the reflection element 17 to the reflection element 18, "d" for the length within the reflection element 18, and "e" for the length from the reflection element 18 to the hologram 14, and the total length of optical path "l" will be as follows.

$$l = a + b + c + d + e$$

In the expression given above, "b", "c", and "d" are constant and "$a + e = c$". Therefore, the foregoing expression may be rewritten as follows.

$$l = 2c + b + d$$

This means that the length "l" of the optical path is constant in spite of any change in the position of the movable member 12 along its fixed course. Thus, the effects that would otherwise act on the interference fringes by the movement of the moving member along its fixed straight course are totally absent from the straightness meter of the present invention.

Finally, the characteristic point (iii) of this invention will be described. When the optical element 20 is substituted by a hologram and the lens 15 and the screen 16 are disposed on the fixed member, the overall mechanism of the meter is highly simplified because it is only the pair of holograms 31, 14 that is fixed on the moving member.

As is noted from the foregoing description, this invention permits the real-time interference to be effected simply with an accuracy on the order of microns. Further, the effect of air disturbance acts mainly in the direction of the optical axis and only slightly in the lateral direction. Thus, the effect of the air disturbance is practically negligible. Even when the holograms or the reflection elements are exposed to external vibration, the effect of the vibration can be alleviated because the object beam and reference beam simultaneously impinge on or are reflected by the same element. Thus, the straightness meter of this invention enjoys very high accuracy of measurement.

What is claimed is:

1. A holographic straightness meter for measuring lateral displacement of a moving member in directions perpendicular to the direction of the movement of said moving member relative to a fixed member comprising: light-emitting means for emitting an object beam and a reference beam from said moving member; a pair of reflection elements disposed on said fixed member and adapted to reflect said object beam and reference beam from said light-emitting means in colinear directions; a hologram disposed on said moving member and adapted to receive said object beam and reference beam coming from said reflection elements and reconstruct said reference beam and said object beam; and, reconstructed image-forming means for focusing the object beam reconstructed by said hologram, whereby the lateral displacement of said moving member is determined by causing the object beam and reference beam from said light-emitting means to be brought onto said hologram, thereby enabling the resultant reconstructed beams to form interference fringes on said image-forming means, and enabling the obtaining of the lateral displacement of the moving member in accordance with the interval, number, and inclination of said interference fringes.

2. The holographic straightness meter according to claim 1, wherein said reconstructed image-forming means is disposed on the moving member.

3. The holographic straightness meter according to claim 1, wherein said reconstructed image-forming means is disposed on the fixed member.

4. The holographic straightness meter according to any of claims 1, 2, or 3, wherein said reconstructed image forming means comprises a collimator lens and a screen.

5. The holographic straightness meter according to any of claims 1, 2, or 3, wherein each of the pair of reflection elements comprises a pair of perpendicularly intersecting mirrors.

6. The holographic straightness meter according to any of claims 1, 2, or 3, wherein each of the pair of reflection elements is a prism.

7. The holographic straightness meter according to claim 1, wherein said light-emitting means comprises: a laser; a first beam splitter for splitting the laser beam from said laser into two laser beams; a diffusing member disposed in the path of the first split beam; and a second beam splitter for combining into one beam the second split beam split by said first beam splitter and the first split beam diffused by said diffusing member.

8. The holographic straightness meter according to claim 1, wherein said light-emitting means includes light-emitting means comprising a hologram which is disposed on said moving member and has recorded thereon fringes resulting from the interference of the object beam with the reference beam and wherein a light source is disposed on said fixed member for delivering a collimated beam to said hologram.

* * * * *